US008442119B2

United States Patent
Misuda

(10) Patent No.: US 8,442,119 B2
(45) Date of Patent: May 14, 2013

(54) MOVING IMAGE DECODING APPARATUS AND PROCESSING METHOD THEREOF

(75) Inventor: Yasuo Misuda, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 542 days.

(21) Appl. No.: 12/414,617

(22) Filed: Mar. 30, 2009

(65) Prior Publication Data

US 2009/0245385 A1    Oct. 1, 2009

(30) Foreign Application Priority Data

Mar. 31, 2008    (JP) .................................. 2008-089222

(51) Int. Cl.
    *H04N 11/04*    (2006.01)
(52) U.S. Cl.
    USPC ..................... 375/240.24; 382/232
(58) Field of Classification Search ........................ None
    See application file for complete search history.

(56) References Cited

U.S. PATENT DOCUMENTS

| | | | | |
|---|---|---|---|---|
| 4,651,206 A | * | 3/1987 | Ohki ......................... | 375/240.16 |
| 5,568,200 A | * | 10/1996 | Pearlstein et al. ......... | 375/240.27 |
| 5,764,658 A | * | 6/1998 | Sekiguchi et al. ........... | 714/752 |
| 5,805,223 A | * | 9/1998 | Shikakura et al. ........ | 375/240.12 |
| 5,847,763 A | * | 12/1998 | Matsumura et al. ...... | 375/240.15 |
| 6,259,736 B1 | * | 7/2001 | Chujoh et al. ........... | 375/240.13 |

FOREIGN PATENT DOCUMENTS

JP    60-162392 A    8/1985

OTHER PUBLICATIONS

ITU-T, "ITU-T Recommendation H.264",*Series H: Audiovisual and Multimedia Systems Infrastructure of audiovisual services—Coding of moving Video Advanced video coding for generic audiovisual services* May 29, 2008.

* cited by examiner

*Primary Examiner* — Christopher S Kelley
*Assistant Examiner* — Mohammed Jebari
(74) *Attorney, Agent, or Firm* — Fujitsu Patent Center

(57) ABSTRACT

A moving image decoding apparatus for decoding moving image data, where the apparatus includes a receiving unit for receiving moving image data, a decoding processing unit for decoding and controlling a display of decoded data, and an output control unit for outputting image data.

The decoding processing unit includes an intra-block line determination unit for selecting a macroblock line in a frame of the moving image data as an intra-macroblock line; a refresh control unit for identifying an area refreshed during one circulation of an intra-macroblock line, wherein the intra-macroblock line is made to periodically circulate in units of a macroblock line for each frame; an error detection unit for detecting a decoding error; an error judgment unit for judging whether the error is within the refreshed area; and a restore point determination unit for determining a restore point to update an image.

6 Claims, 13 Drawing Sheets

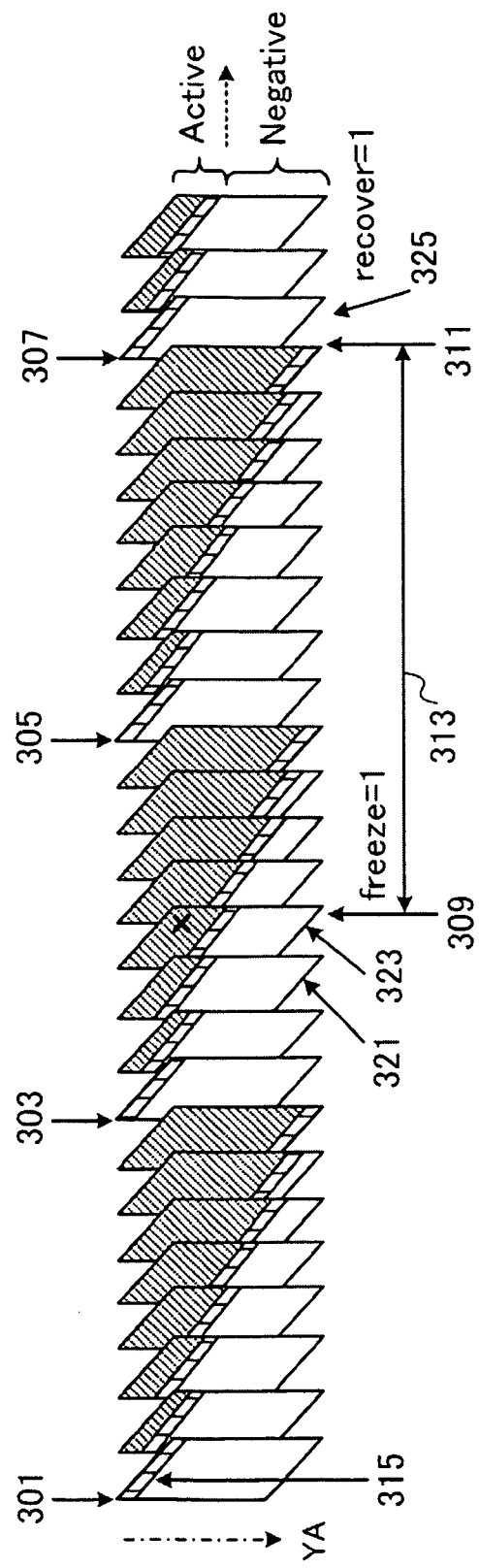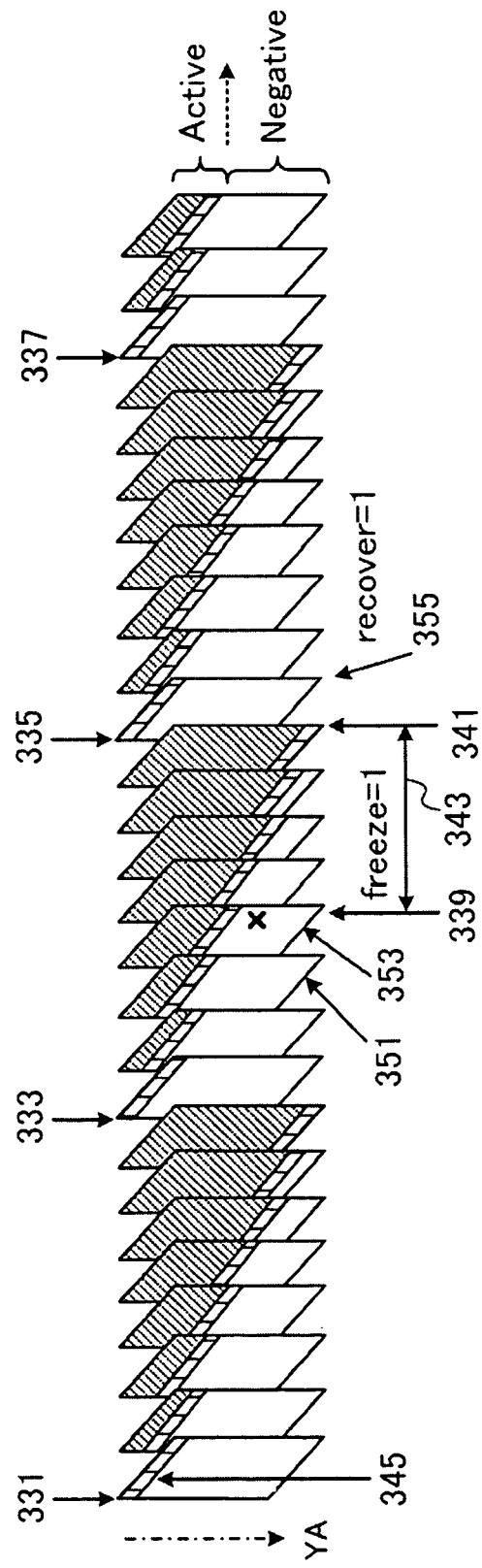
FIG. 10A
FIG. 10B

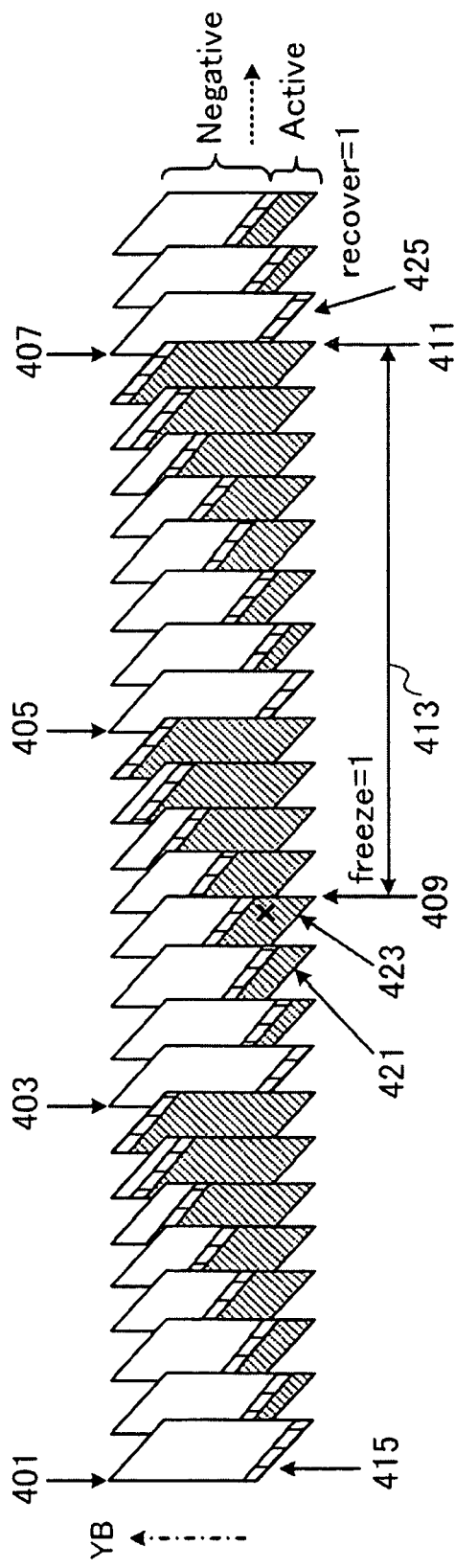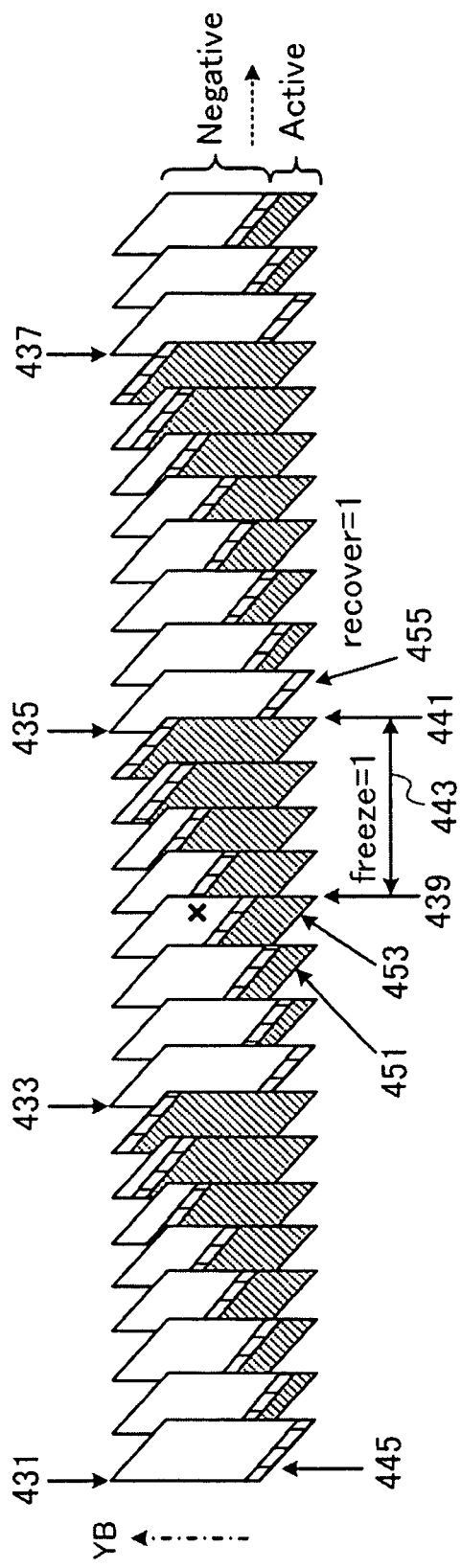
FIG. 11A
FIG. 11B

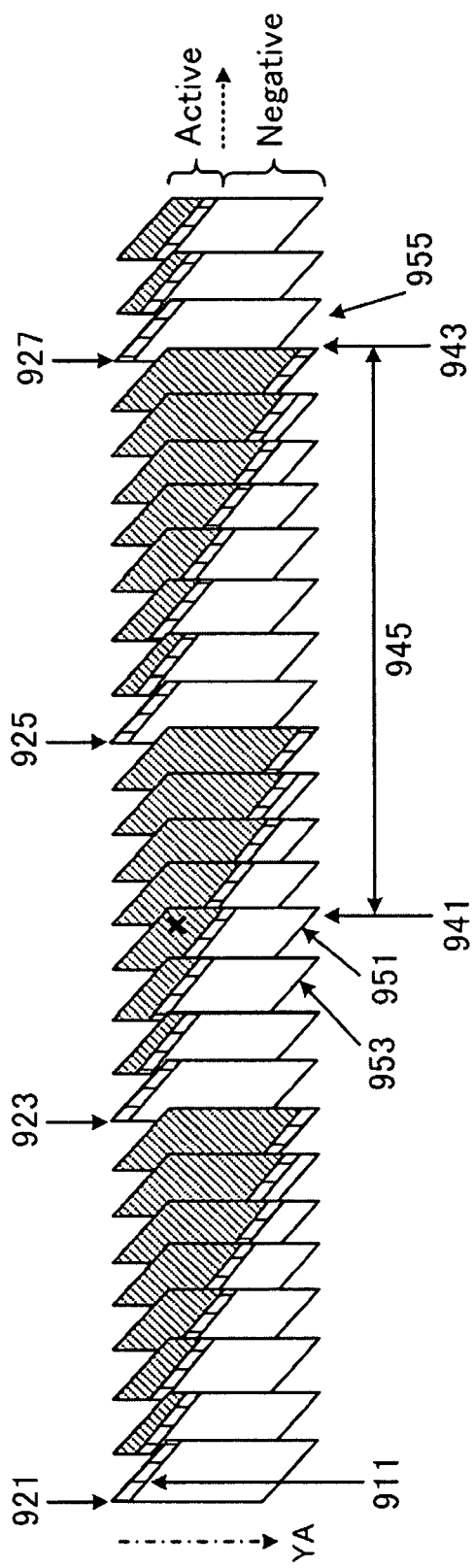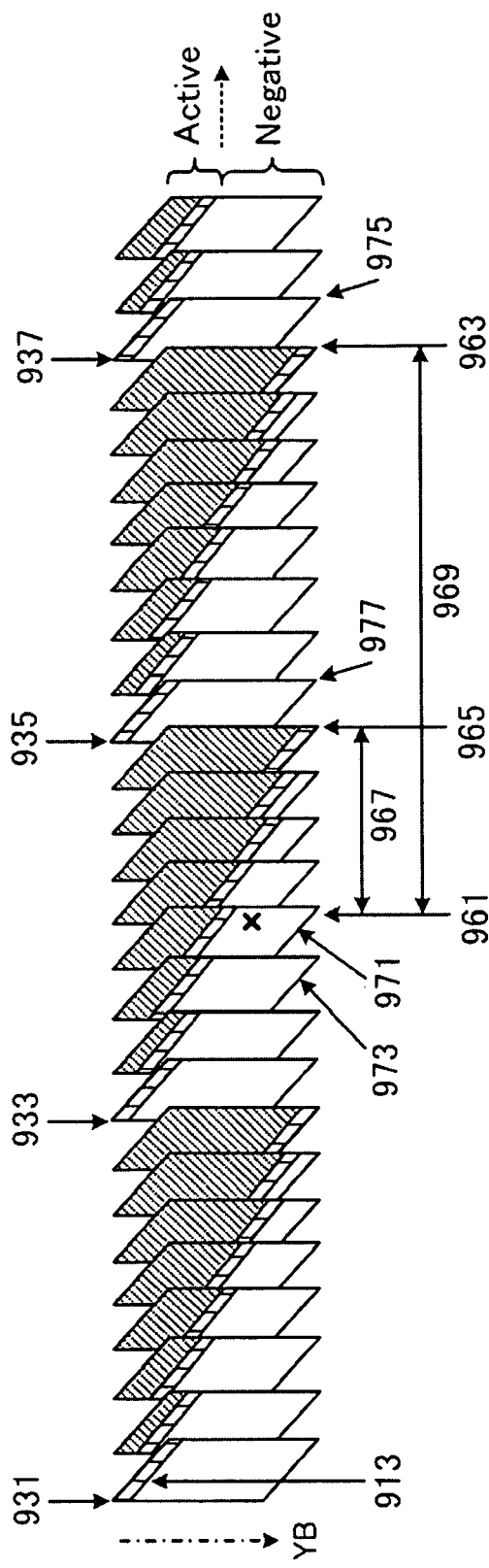

MOVING IMAGE DECODING APPARATUS AND PROCESSING METHOD THEREOF

CROSS-REFERENCE TO RELATED APPLICATIONS

This application is based upon and claims the benefit of priority of the prior Japanese Patent Application No. 2008-89222 on Mar. 31, 2008, the entire contents of which are incorporated herein by reference.

FIELD

The present invention relates to a moving image decoding apparatus and a processing method thereof, and particularly relates to a moving image decoding apparatus and the method for performing intra-field and inter-field predictive decoding of moving image comprised of a plurality of encoded frames or fields.

BACKGROUND

Conventionally, in decoding a moving image comprised of a plurality of encoded frames or fields, for example when a packet loss occurs for data received from a communication path, or when a bit error occurs upon reading decoded data, the data may not be appropriately decoded, and the damaged image is displayed if the display processing is performed as is.

FIG. 12 is an explanatory diagram illustrating pictures of moving image frames and error generation in MPEG-2.

FIG. 12 illustrates a sequence of frames of moving images in MPEG-2. In MPEG-2, three kinds of pictures are defined: Intra-coded Picture (I-picture), Predictive-coded Picture (P-picture), and Bi-predictive picture (B-picture).

The I-picture is encoded while being closed in the frame and does not refer to another frame (picture). The P-picture performs inter-frame prediction in a forward direction from a frame (picture) in the past, and encodes the prediction error. The B-picture performs bidirectional inter-frame prediction using frames (pictures) in the past and frames in the future and encodes the prediction error.

Whether or not an error occurs in pictures of moving image frames is monitored, and if, for example, an error occurs, the picture 903 that is the last normal picture preceding the picture 905 where the error occurs is kept displayed (called a "freeze state"). A method is employed in which the original display is restarted at the frame timing of the picture 907 from where the image may be recovered. Whether a decoding error occurs or not is checked by monitoring macroblocks and seeing where an error occurs in a picture, and if any macroblock where an error occurs exists, updating the display is stopped.

As shown in FIG. 12, if a picture 901 and a picture 907 are I-pictures, decoding may be performed by using the intra-frame information from their own frames. Thus if no error occurs, updating the display at the frame timing of the picture 907 is easy and common.

Generally, a refresh method using an intra-slice (hereunder, called the "intra-slice refresh method") is employed when achieving error detection and display control in moving image encoding that achieves low-delay.

The intra-slice refresh method does not use B-pictures in order to avoid delays caused by rearranging the order of the pictures. The processing is performed in units of, for example, a macroblock of 16×16 pixels in a picture. The types of macroblocks include an intra-macroblock for encoding within a picture and an inter-macroblock for encoding between pictures.

A "slice" is a group of given macroblocks (for example, a block comprised of vertical 16 pixels×horizontal 16 pixels) arranged horizontally. In MPEG-2, a specific macroblock group (usually from one to a plurality of rows of macroblocks strips in the horizontal direction, or from one to a plurality of columns of macroblock strips in the vertical direction) within a picture is called an "intra-column." Macroblocks may also be arranged in a rectangular form.

An "intra-slice" is a group of blocks encoded only by image data in a picture. In the intra-slice refresh method, data in a macroblock line in each P-picture is encoded as an intra-macroblock, and the macroblock line is shifted for each cascaded picture so that the intra-slice circulates all the pictures at a substantially constant cycle, and thereby refreshes all the pictures.

The intra-slice refresh method does not require an I-picture that is a main cause for a delay. Thus, a delay caused by a refresh may be shortened with little deterioration of image quality.

However, if motion compensation is applied to slices other than P-picture slices by using a vector without a limitation, a macroblock refreshed by an intra-slice refers to the position of a picture before intra-slice refreshing is applied even if an intra-slice periodically circulates all the pictures. Thus, an error may be propagated spatially and at worst the error screen may continue to be displayed.

In order to reduce or avoid this spatial error propagation, there is the following error detection and display control method.

The error detection and display control method prevents an error from being transmitted by prohibiting motion compensation using a non-zero motion vector for a given period. This prevents an error by motion compensation in one block from moving spatially or increasing.

Unlike MPEG-2/4, the AVC/H.264 standard employs "Exponential-Golomb coding" which does not require a variable length code table.

In many cases, the Exponential-Golomb code may be decoded even when 1 bit of 0 and 1 are reversed, therefore a bit error is difficult to detect. Moreover, even when an error occurs, decoding processing continues for a certain period and an error is detected after a certain amount of time. Thus the position where the bit error is detected and the position where the error is actually generated may often differ. As explained above, regarding detecting an error and controlling a display by a moving image decoding apparatus that conforms to the AVC/H.264 standard, conventionally no apparatus or method exists that achieves low-delay.

FIG. 13 is a figure illustrating an example of error detection and a display control upon decoding a moving image based on the AVC/H.264 standard.

FIG. 13A illustrates a moving image only comprised of P-pictures that include intra-macroblocks. The position of an intra-macroblock (intra-MB) 911 in each of the continuous images sequentially shifts from the upper to the lower parts of the pictures (in the direction of the arrow YA) as time passes. When, the intra-MB 911 reaches the bottom of the picture, the intra-MB 911 moves to the top in the next picture.

The positions of intra-MB 911 and intra-MB 913 periodically shift. The cycle in which the position of an intra-MB shifts in a picture is called a "refresh cycle". For example, in FIG. 13A and FIG. 13B, the refresh cycle is a period of 8 frames.

The encoded data in the next picture located in the same positions as those of intra-MB 911 and intra-MB 913 is not data encoded by intra-frame prediction, but by inter-frame forward direction prediction. Thus, the image may be restored by using an intra-MB immediately before. Therefore, a set of encoded data for one refresh cycle enables decoding of the picture and the subsequent pictures.

At timings of the first intra-MB in each refresh cycle, 921, 923, 925, 927, and 931, 933, 935, 937 illustrated in FIGS. 13A and 13B, the moving image decoding apparatus receives parameters of header information on AVC/H.264 encoded data.

The parameter includes information such as a sequence parameter set (SPS), a picture parameter set (PPS), and supplemental enhancement information (SEI).

The SPS is information for defining a parameter for an entire encoded sequence. The PPS is information for defining a parameter of a picture. The SEI is not required for the decoding process itself but is used for supplemental information on decoding processes as information on image freezing/releasing, and recovery points.

In the AVC/H.264 standard, at each refresh cycle, the restore point is indicated by using a recovery point from the SEI that includes the data for the decoding process, and thus the initiation of correct decoding from the restore point can be enabled.

FIG. 13A illustrates an overview when an error occurs in an Active area, while FIG. 13B illustrates an overview when an error occurs in a Negative area.

The Active area is where refresh processing in a refresh cycle has already been completed. The Negative area is where refresh processing has not been applied yet. In FIG. 13, a shaded area in addition to the intra-MB area indicates an Active area, whereas a white area indicates a Negative area.

In FIG. 13A, an error occurrence point 941 indicates frame timing at which a decoding error occurs within an Active area. The picture 951 is a picture at the frame timing of the error occurrence point 941. A picture 953 is a picture at the frame timing immediately before the error occurrence point 941.

A restore point 943 indicates a frame timing where a picture display is released after continuing to display the picture 953 from the error occurrence point 941. Therefore, if no decoding error occurs between the error occurrence point 941 and the restore point 943, the display may be updated at a picture 955 which is the frame timing next to the restore point 943.

In FIG. 13B, an error occurrence point 961 indicates a frame timing where a decoding error occurs within a Negative area. The picture 971 is a picture of the error occurrence point 961, while a picture 973 is a picture of the frame timing immediately before the error occurrence point 961.

A restore point 963 indicates a frame timing where a display of the picture 973 is released after continuing to display the picture 973 located before the error occurrence point 961 starting from the point 961.

In the above conventional method, judging whether an error occurs in the Active area or the Negative area and controlling the display corresponding to the error occurrence point are not performed. Therefore, when an error occurs in a Negative period (error occurrence point 961), the picture 973 instead of the picture 971 is continuously displayed until after passing the period 969 where the next refresh cycle ends, that is the picture 973 is displayed up to the frame timing of restore point 963.

Then the display is updated at the picture 975 based on the recovery point information included in the SEI of parameter information received at the timing 937.

However, the parameter information on a moving image is received at a timing 935 before the timing 937. Therefore, the timing 935 is actually the restore point where the display of picture 971 may be released in the shortest period. The display may be updated at the picture 977 with the timing 935 being a restore point 965, as long as the error occurrence point is within the Negative area and no error occurs thereafter. A period 967, which extends from the error occurrence point 961 to the nearest restore point 965, is short compared to the period 969, which extends from the error occurrence point to the conventional restore point 963.

In the conventional method, whether an error occurs in a Negative area or an Active area is not judged and only an occurrence of a decoding error is judged. Moreover, a display control is applied to an error that occurs in the Negative area at the similar restore timing as an error that occurs in the Active area. Thus, the display may not be restarted in the shortest period when an error occurs in the Negative area, and so a delay may be caused in restoring the normal display.

Moreover, a decoding apparatus performing intra-slice refreshing of an intra-MB in a fixed circulation direction, (e.g., simply treats the area above an intra-MB as refreshed and an area below an intra-MB as unrefreshed) cannot support an encoding apparatus that operates in a reverse direction (e.g., in which the intra-slice refresh circulates from the lower side of an intra-MB). Conversely, a decoding apparatus performing intra-slice refreshing of an intra-MB in circulation from the lower side cannot support an encoding apparatus performing intra-MB circulation from the upper side. Thus, the decoding apparatuses lack versatility in processing.

SUMMARY

According to an aspect of the embodiment, a moving image decoding apparatus decodes moving image data comprised of a plurality of encoded frames. The apparatus includes a receiving unit for receiving moving image data, a decoding processing unit for decoding and controlling a display of decoded data, and an output control unit for outputting image data to be displayed on an image display apparatus.

The decoding processing unit includes an intra-block line determination unit for selecting a macroblock line in a frame of the moving image data as an intra-macroblock line; a refresh control unit for identifying an area refreshed during one circulation of an intra-macroblock line, wherein the intra-macroblock line is made to periodically circulate in units of a macroblock line for each frame; an error detection unit for detecting a decoding error of decoded data; an error judgment unit for judging whether a place where the decoding error occurs is within the refreshed area or not; and a restore point determination unit for determining a restore point to update an image of the moving image data based on the judgment whether the error occurs within the refreshed area or not.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

These and/or other aspects and advantages will become apparent and more readily appreciated from the following description of the embodiments, taken in conjunction with the accompanying drawings of which:

FIG. 10A is a diagram illustrating an overview of an error detection operation within a refreshed area to restore when refreshing from the upper side to the lower side of a picture;

FIG. 10B is a diagram illustrating an overview of an error detection operation outside a refreshed area to restore when refreshing from the upper side to the lower side of a picture;

FIG. 11A is a diagram illustrating an overview of an error detection operation within a refreshed area to restore when refreshing from the lower side to the upper side of a picture;

FIG. 11B is a diagram illustrating an overview of an error detection operation outside a refreshed area to restore when refreshing from the lower side to the upper side of a picture;

FIG. 13A is a diagram illustrating an example of display control when an error of decoding a moving image in an Active area is detected based on the AVC/H.264 standard; and FIG. 13B is a diagram illustrating an example of display control when an error of decoding a moving image in a Negative area is detected based on the AVC/H.264 standard.

DESCRIPTION OF EMBODIMENT

Figure 1:
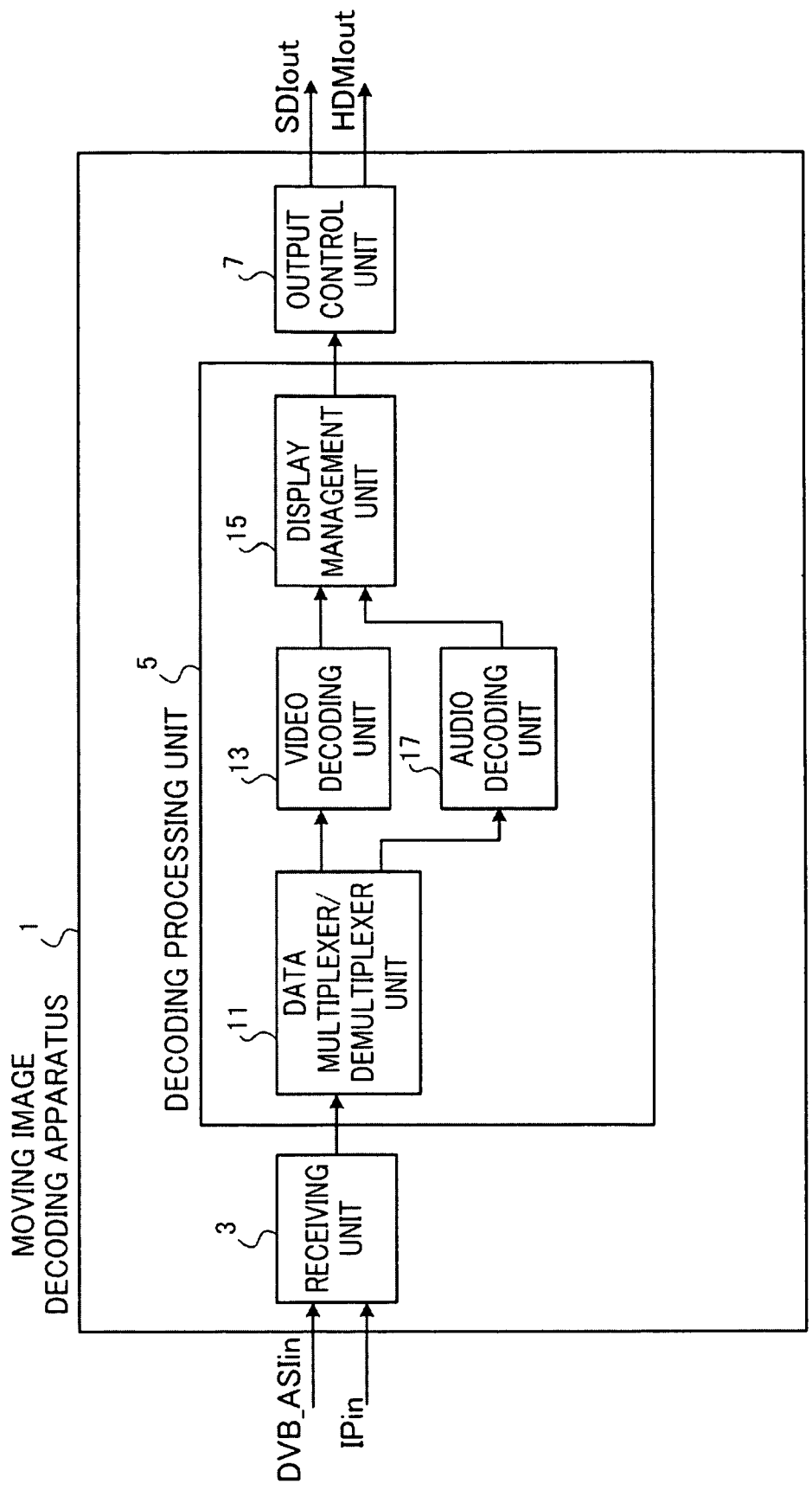
FIG. 1 is a diagram illustrating a basic configuration of a moving image decoding apparatus.

FIG. 1 is a diagram illustrating a basic configuration of a moving image decoding apparatus of this invention.

The moving image decoding apparatus 1 in FIG. 1 includes a receiving unit 3, decoding processing unit 5, and an output control unit 7.

The decoding processing unit 5 includes a data multiplexer/demultiplexer unit 11, a video decoding unit 13, a display management unit 15, and an audio decoding unit 17.

A DVB-ASIin signal or an IPin signal is connected to the moving image decoding apparatus as interface input signals. The input signal includes a stream data of MPEG-Transport Stream (TS) format.

The receiving unit 3 may receive either one of the two interface input signals (DVB-ASIin, or IPin) and selects and uses one of the signals as an input. Note that at least one of DVB-ASIin, or IPin may be connected.

The data multiplexer/demultiplexer unit 11 rearranges serial data received from the receiving unit into units of bytes, and transfers encoded data including video data to a video decoding unit 13, and encoded data including audio data to an audio decoding unit 17 respectively.

The video decoding unit 13 decodes the encoded video data in units of one picture. A picture that is image information is processed in units of a macroblock.

The audio decoding unit 17 decodes the encoded audio data.

After processing data for one picture at the video decoding unit 13 and the audio decoding unit 15, the decoded data and error information etc. are transferred to a display management unit 15.

The display management unit 15 performs display setting control in order to adjust timing of video data and audio data that has been decoded. In the display setting control, image freeze processing when a decoding error occurs is set based on error information, etc. The data set by the display management unit 15 is sent to the control unit 7 as output data.

The control unit 7 controls displaying and stopping image data decoded based on the above settings, and outputs data to a monitor etc. with a given signal format.

Now, operation overview of the entire moving image decoding apparatus 1 will be explained.

A receiving unit 3 of the moving image decoding apparatus 1 receives input signals, extracts only stream data of MPEG-TS format, and then transfers the data to the data multiplexer/demultiplexer unit 11 in a decoding processing unit 5.

The data multiplexer/demultiplexer unit 11 demultiplexes the transferred data into video data and audio data, and then takes out the data. Then the unit 11 transfers the taken-out data to a video decoding unit 13 and an audio decoding unit 17.

The video decoding unit 13 decodes the received video data. The audio decoding unit 17 decodes the received audio data. Upon completion of processing by the video decoding unit 13 and the audio decoding unit 17, the completion of each of the video and audio decoding is notified to the display management unit 15.

The display management unit 15 performs display settings control in order to adjust the timings of the video data and audio data that have been decoded. In display settings control, settings such as a freeze state when a decoding error occurs are set. The display management unit 15 transfers the set data to the output control unit 7 as output data.

The output control unit 7 converts the output data sent from the display management unit 15 into High Definition television—Serial Digital Interface (HD-SDI)/Standard Definition (SD)—SDI signal format (SDIout in FIG. 1), or High Definition Multimedia Interface (HDMI) signal format (HDMI-out in FIG. 1), and then outputs the data to a monitor, etc.

Figure 2:
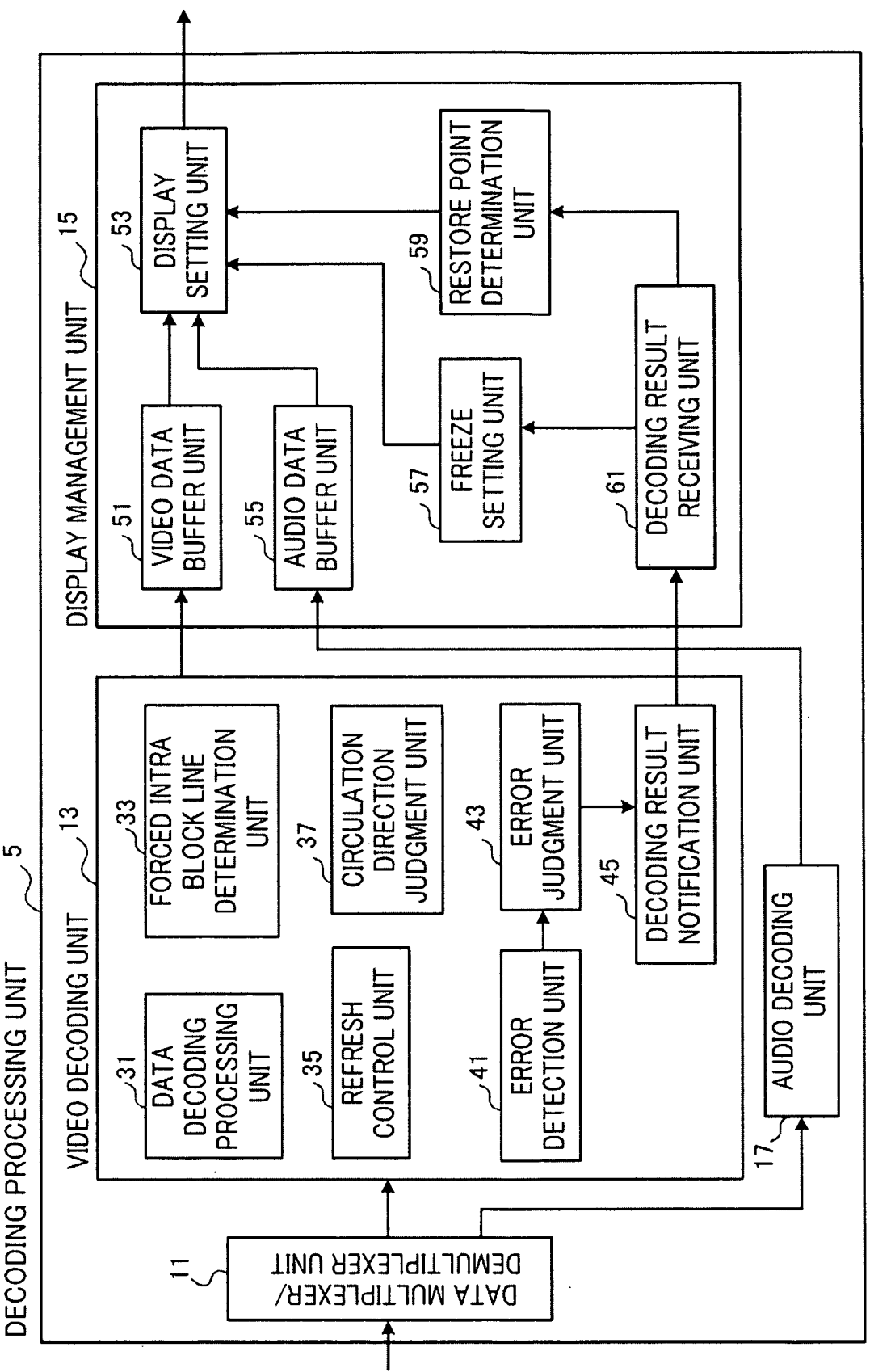
FIG. 2 is a diagram illustrating a detailed configuration of a decoding processing unit.

FIG. 2 is a diagram illustrating the detailed configuration of a video decoding unit 13 and the display managing unit 15 included in a decoding processing unit 5.

The video decoding unit 13 includes a data decoding processing unit 31, a forced intra-block line determination unit 33, a refresh control unit 35, a circulation direction judgment unit 37, an error detection unit 41, an error judgment unit 43, and a decoding result notification unit 45.

The data decoding processing unit 31 decodes encoded data transferred from the data multiplexer/demultiplexer unit 11 in units of one picture.

The forced intra-block line determination unit 33 determines a position of a macroblock line (MB line), which is a group of macroblocks arranged horizontally within a picture, for encoding all data as an intra-MB.

In MPEG-2, when generating an intra-slice, all macroblocks in a designated slice may be designated as an intra-MB by turning on a flag since the syntax of an intra-slice exists in a slice header. However, AVC/H264 standard does not provide this syntax; thus an intra-slice may not be generated.

The forced intra-block line determination unit 33 generates an object equivalent to an intra-slice by forcefully making any MB line into an intra-MB line. The function will be described as "an intra-slice" hereinafter.

The refresh control unit 35 uses an intra-slice that encodes all the data in an MB line, which is composed of macroblocks arranged horizontally in a picture, as an intra-MB. Thus, a position of an MB line applicable to an intra-slice is shifted for each picture. The cycle of shifting the position is substantially constant and all the pictures are refreshed by controlling the intra-slice so that the intra-slice circulates through all the pictures.

The circulation direction judgment unit 37 judges whether an intra-slice circulates from the upper side or the lower side.

The error detection unit 41 detects an occurrence of a decoding error in a picture.

The error judgment unit 43 determines whether the detected error occurs within a refreshed area (Active area) or outside of the refreshed area (Negative area).

The decoding result notification unit 45 sends information such as existence and non-existence of an error, freeze settings, and the position of a restore point from the error judgment unit 43 to the display management unit 15.

The display management unit 15 includes a video data buffer unit 51, a display setting unit 53, an audio data buffer unit 55, a freeze setting unit 57, a restore point determination unit 59, and a decoding result receiving unit 61.

The video data buffer unit 51 is a storage unit for temporarily storing decoded picture data transferred from the video decoding unit 13. The data required for display among the stored picture data is output to the output control unit 7. Picture data that is not selected for settings of freeze state after error occurrence is not taken out from the video data buffer unit 51 and not output to the output control unit 7.

An audio data buffer unit 55 is a storage unit where audio data corresponding to picture data is temporarily stored.

A display setting unit 53 determines data to be displayed based on information such as image storage address at the video data buffer unit 51 as well as information on the image size, picture type, restore point/freeze state settings (shown in FIG. 9 described later). Then the unit 53 takes out the corresponding data from the video data buffer unit 51 and the audio data buffer unit, and transmits the data to the output control unit 7.

A freeze setting unit 57 determines a picture to be frozen by frame timing based on information of the decoding result receiving unit 61, and sets the timing at the display setting unit 53.

The restore point determination unit 59 determines a restore point of a picture by frame timing based on information of the decoding result receiving unit 61, and sets the timing at the display setting unit 53.

The decoding result receiving unit 61 receives information such as existence or non-existence of an error, freeze settings, and the position of a restore point from the decoding result notification unit 45, and sets the settings of the freeze setting unit 57 and the restore point determination unit 59 based on the received information.

Figure 3:
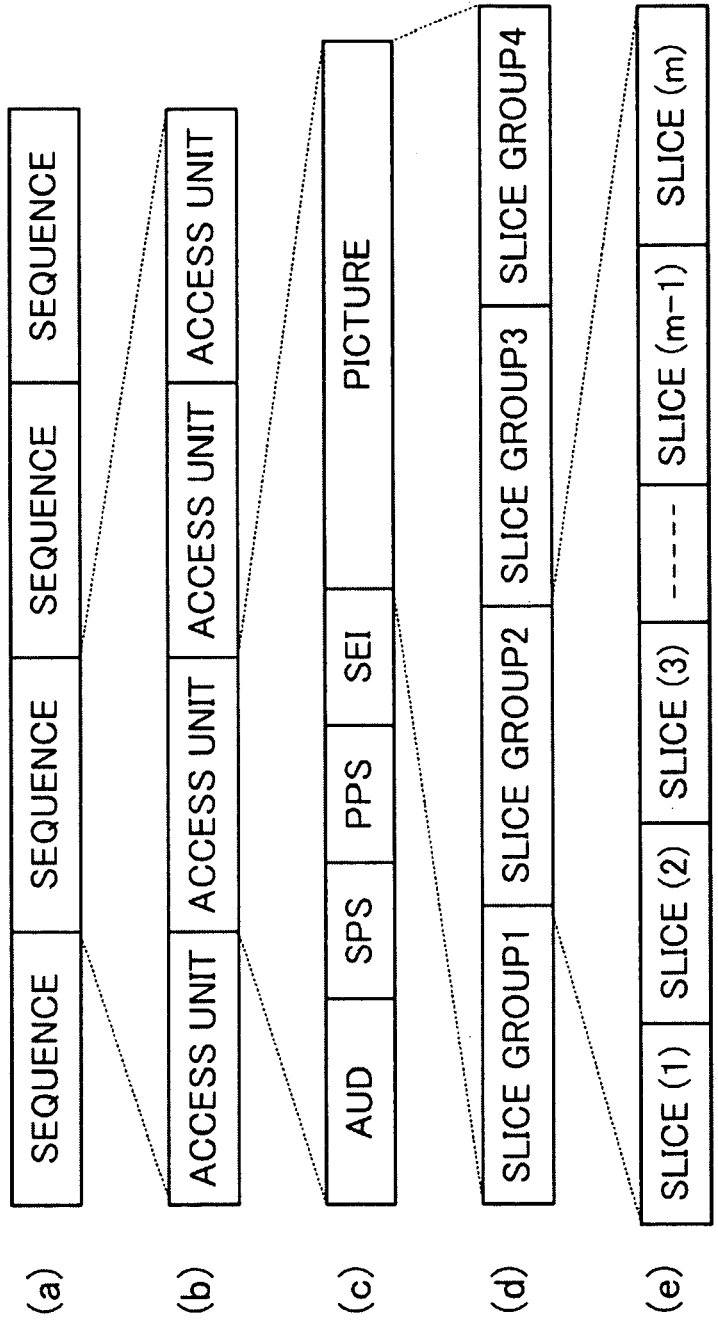
FIG. 3 is a diagram illustrating data structures that comply with AVC/H.264.

FIG. 3 is a diagram illustrating an example of data structure that complies with AVC/H.264 when bit stream data is employed.

A receiving unit 3 of a moving image decoding apparatus 1 extracts bit stream data shown in FIG. 3 from an input signal. FIGS. (a) to (e) illustrate contents of an encapsulated data structure in order from the upper layer.

As shown in FIG. 3(a), the data structure of a bit stream is a group made up of one or a plurality of sequences. One sequence is specified as a group of pictures as in conventional MPEG.

As shown in FIG. 3(b), one sequence in FIG. 3(a) is made up of one or a plurality of access units.

As shown in FIG. 3(c), the structure of one access unit in FIG. 3(b) is a group of data made up of information such as AUD, SPS, PPS, and SEI, and one picture. Note that other data information such as End of Sequence (EOS) is not shown in the figure.

As shown in FIG. 3(d), one picture in FIG. 3(c) is made up of a plurality of slice groups, for example, four slice groups.

As shown in FIG. 3(e), one slice group in FIG. 3(d) is made up of a plurality of slices (1) to (m) (where "m" is an integer).

Figure 4:
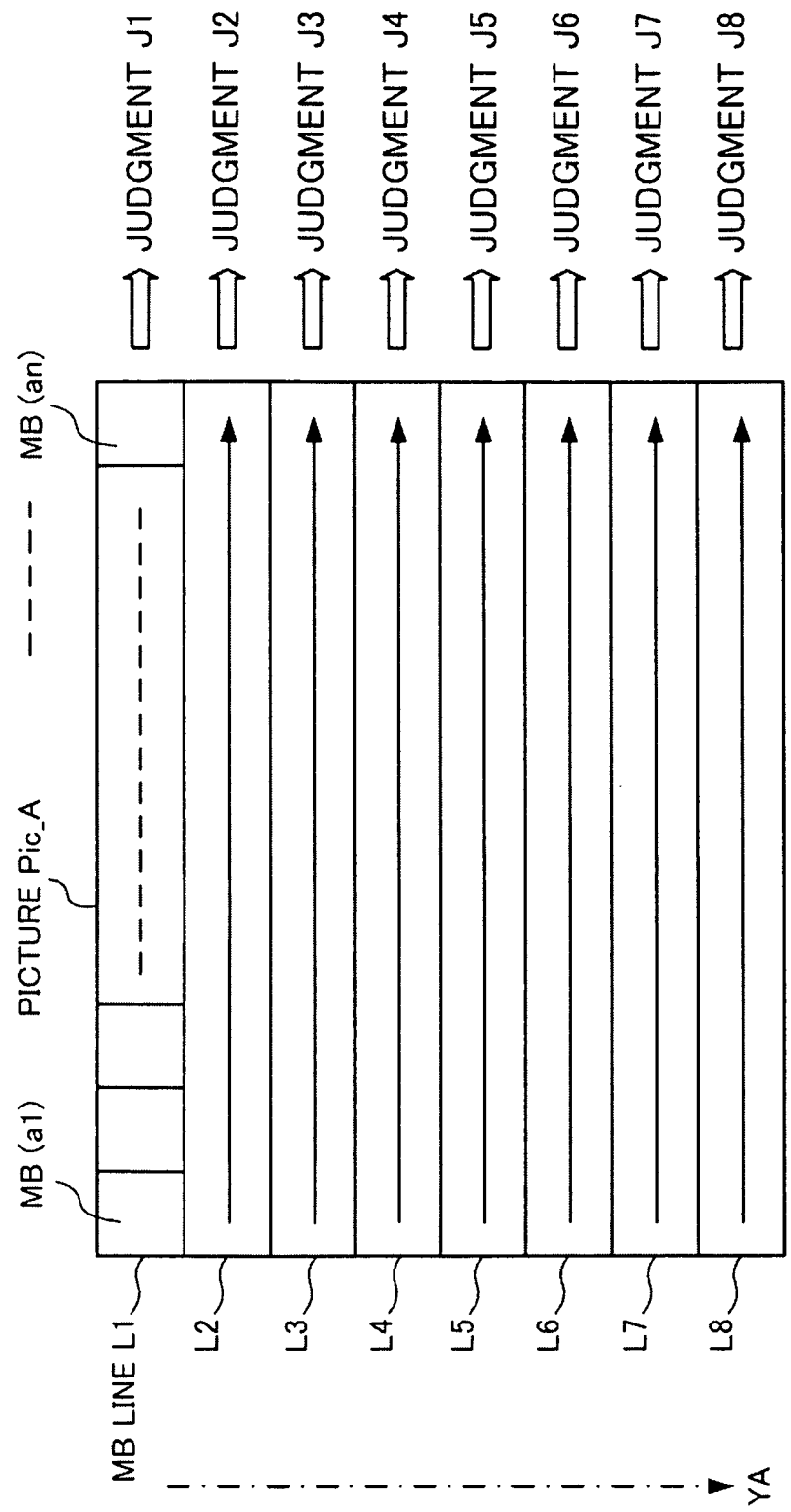
FIG. 4 is an explanatory diagram illustrating detecting and judging an error performed in units of one picture of a moving image.

FIG. 4 is an explanatory diagram illustrating detecting and judging an error performed in units of one picture of a moving image.

MB lines L1 to L8 are set in a picture Pic_A in FIG. 4. Each line of MB line L1 to L8 is one slice and corresponds to one slice (i) shown in FIG. 3(e) (where "i" is an integer from 1 to m).

One MB line in the picture Pic_A may be made up of a plurality of slices (i). A slice group shown in FIG. 3(d) may be grouped such as a slice group 1 (MB line L1, L2), a slice group 2 (MB line L3, L4), a slice group 3 (MB line L5, L6), and/or a slice group 4 (MB line L7, L8). Moreover, such groupings may be made between the MB lines shown in FIG. 4.

The MB line L1 in FIG. 4 is separated into units of macroblocks MB(a1) to MB(an). Likewise, each of the MB lines L2 to L8 is separated into units of macroblocks MB(a1) to MB(an).

Judgments J1 to J8 indicate that an error judgment processing, described later, is performed for each of MB lines L1 to L8 in a decoding processing of one picture.

First, the data decoding processing unit 31 stores picture data of the data shown in FIG. 3(c) in a memory (not shown) in order of slices (i) shown in FIG. 3(e) from macroblocks MB(a1) to MB(an) of the MB line L1 shown in FIG. 4. Moreover, the data is stored in a memory (not shown) in the YA direction of MB lines L1 to L8 shown in FIG. 4.

The video decoding unit 13 decodes data stored in the memory in units of 1 picture. In this case, the picture PIC_A is processed in units of macroblocks (for example, in units of MB (a1) to MB(an)). For example, one unit of a macroblock is 16×16 pixels.

Now, an overview of error judgment processing will be described.

Operation S1: An error judgment unit 43 judges whether an MB line Lx (where "x" may be 1 to 8) is an intra-MB line or not every time processing of an MB line Lx of picture Pic_A ends.

Operation S2: An error detection unit 41 sets an error detection flag "error Detect" if a decoding error occurs while searchState is Active when a refreshed area is set as a searchState parameter.

Operation S3: A decoding result notification unit 45 passes the "errorDetect" information to a display management unit 15 (shown in FIG. 2) upon completion of a judgment for the entire picture Pic_A (judgments J1 to J8).

Operation S4: The display management unit 15 displays the picture at the nearest restore point when no error occurs within the area of the restore point (when an error occurs in the "Active" area, "errorDetect"=1).

Figure 5:
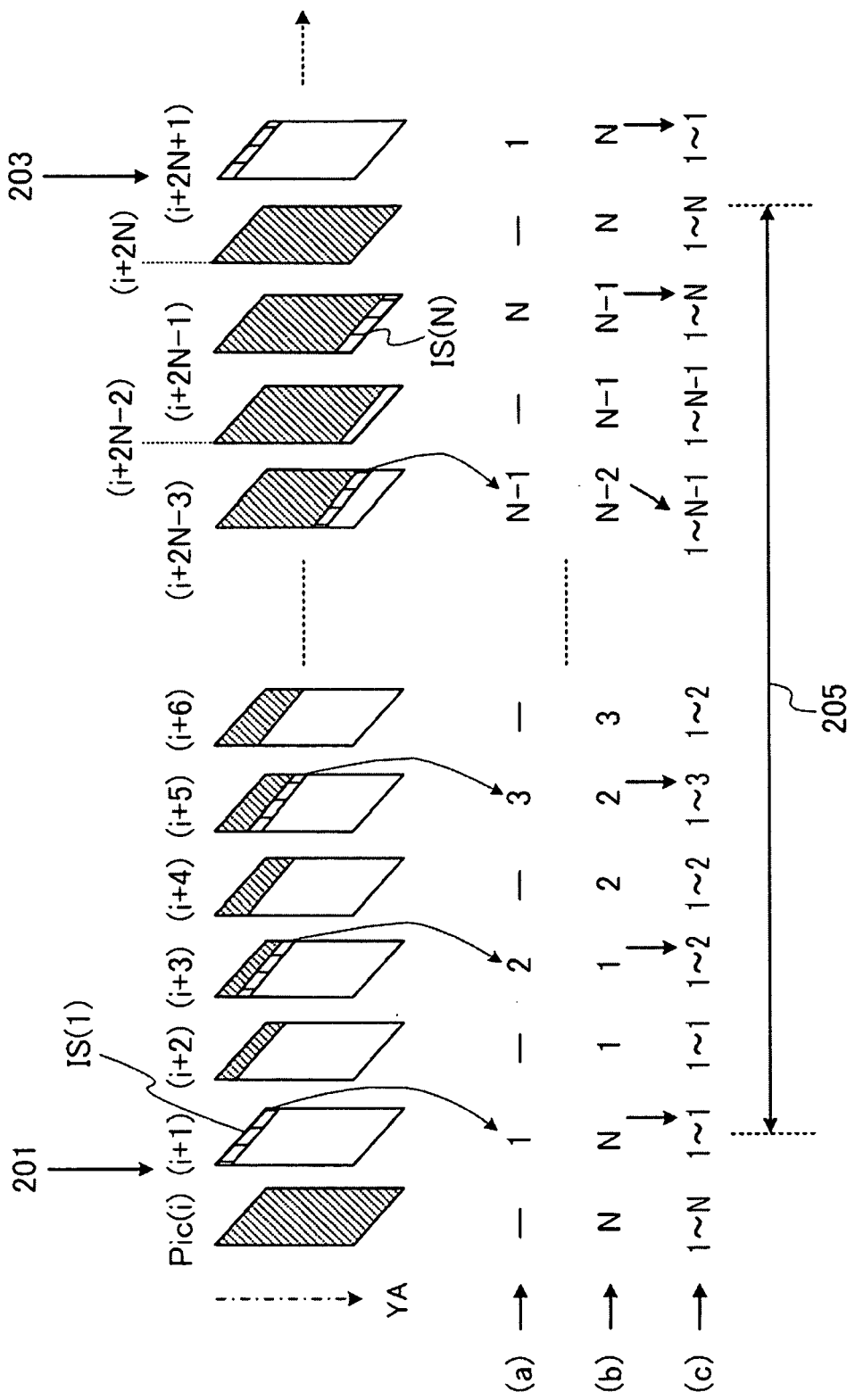
FIG. 5 is a diagram illustrating processing of an error judgment when an intra-slice circulates from the upper side to the lower side.

FIG. 5 illustrates processing of an error judgment when an intra-slice circulates from the upper side to the lower side.

Figure 6:
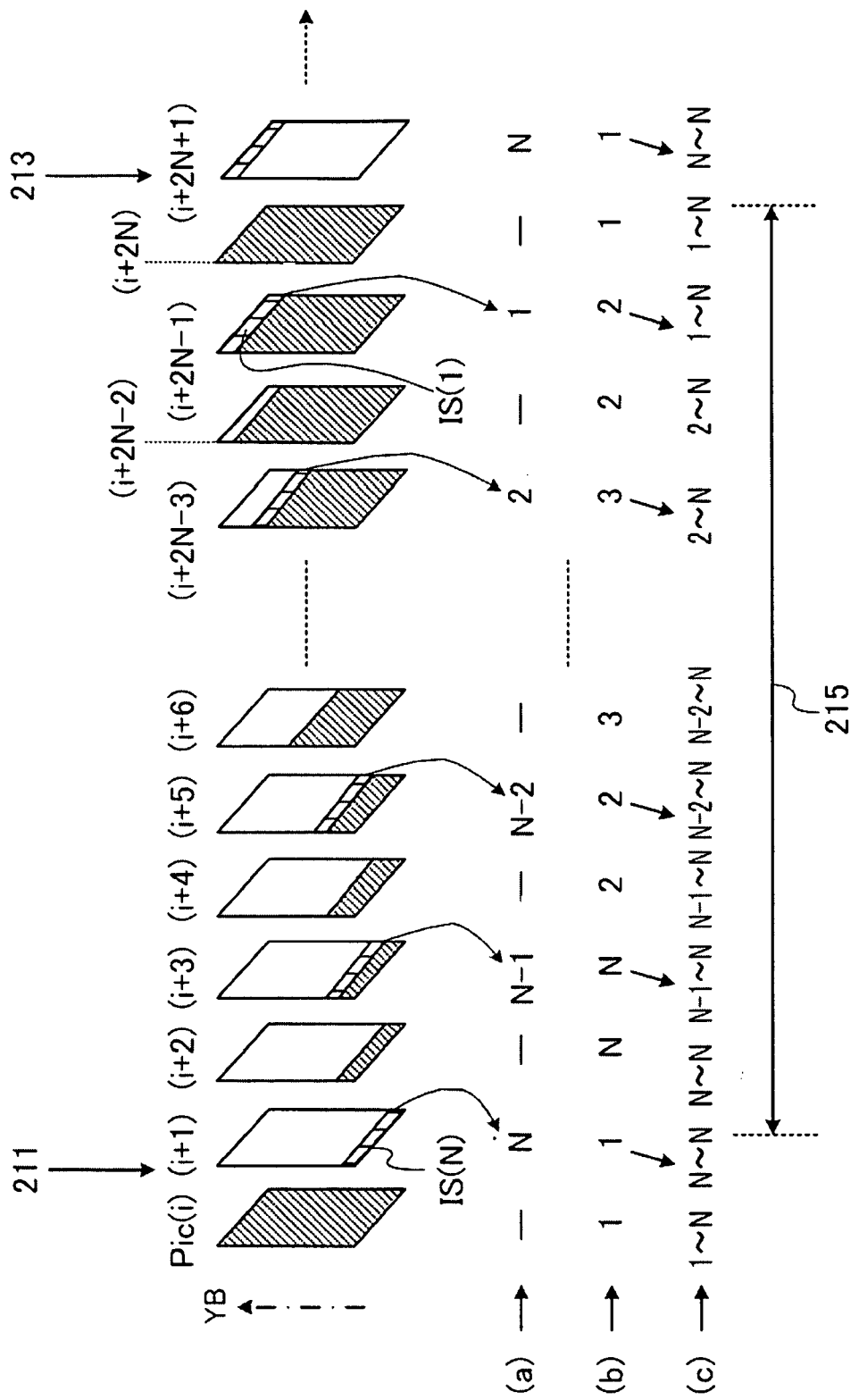
FIG. 6 is a diagram illustrating processing of an error judgment when an intra-slice circulates from the lower side to the upper side.

FIG. 6 illustrates processing of an error judgment when intra-slice circulates from the lower side to the upper side. An example of processing explained below by referring to FIG. 5 and FIG. 6 is an example of a refresh method using an intra-slice and a vector limit.

In FIG. 5, Pic(i) (where "i" is an integer) indicates a picture in which a block indicating the section to which error judgment is applied is located. The processing of a plurality of blocks of pictures (Pic (i) to Pic (i+2N+1)) is shown in order of the movement of an intra-slice from the upper side to the lower side. The shaded area of the picture indicates a refreshed ("Active" area (including the intra-slice).

Intra-slices IS (1) to (N) are intra-slices that correspond to each block in pictures (Pic (i+1), Pic (i+3), . . . , Pic (i+2N−1), Pic (i+2N+1). Moreover, pictures Pic (i), Pic (i+2), . . . , Pic (i+2N−2), Pic (i+2N) are only pictures with a vector limit and do not include an intra-slice. The arrow YA indicates the movement direction of the intra-slice.

Timings 201 and 203 indicate restore points where a display control may be released. A period 205 indicates an area of error judgment for one picture between the timing 201 and the timing 203.

Now, an overview of error judgment within a refreshed area in error judgment processing by the error judgment unit 43 will be described.

As shown in FIG. 5, whether an error occurs in a refreshed area (that is an area where already has been refreshed) or not is judged using values of a line number (a) of an intra-slice IS which change as the process proceeds, values of a line number (b) of intra-slice IS which existed in the preceding picture, and values of an area (c) that indicates a refreshed area.

Operation S11: The error judgment unit 43 searches in the picture for a line number (a) of an MB line in which the entire MB line is an intra-MB.

Operation S12: If an MB line number (a) exists, the MB line number (a) is compared to the preceding MB line number (b).

Operation S13: If the MB line number (a) is greater than MB line number (b), the upper limit value of a refreshed area (c) is incremented to obtain a new refreshed area (c). Actually, the incremented value and the MB line number (a) are the same, and thus the upper limit value of the refreshed area (c) (the direction in which "i" of Pic (i) increases in FIG. 5) may be replaced with an MB line number (a).

Operation S14: If there is no MB line number (b), the same area as that of the preceding picture is assumed to be an error occurrence area. The right side which is the upper limit value of the refreshed area (c) is set to "1", if "(a)=1" and "(b)=N".

Specific examples of the error judgment process will be described by referring to FIG. 5.

Example 1

When the line number of the intra-slice (a)=1 (uppermost line) and the line number of the intra-slice in the preceding picture (b)=N, a refreshed area (c) is line numbers 1 to 1. This means that if an error occurs in the current intra-slice (line number=1), the error is judged to occur within the refreshed area.

Example 2

When line number of the intra-slice (a)=2 and the line number of the intra-slice in the preceding picture (b)=1, a refreshed area (c) is line numbers 1 to 2. This means that if an error occurs within the area of line numbers 1 to 2, the error is judged to occur within the refreshed area.

Example 3

When the line number of the intra-slice (a)=3 and the line number of the intra-slice in the preceding picture (b)=2, a refreshed area (c) is line numbers 1 to 3. This means that if an error occurs within the area of line numbers 1 to 3, the error is judged to occur within the refreshed area.

Detecting and judging errors (judgments J1 to J8) is performed for each of the MB lines L1 to L8 in a picture Pic_A illustrated in FIG. 4. Based on the result, whether the error occurs in the refreshed area or not is judged, and the restore point is determined accordingly.

When an error occurs outside the refreshed area in a period 205 shown in FIG. 5, an error judgment unit 43 may determine the restore point to be a timing 203 at the shortest. Thus, the period for the display update is shortened.

On the other hand, if an error occurs within the refreshed area, the restore point is determined to be the next restore point after the timing 203.

In FIG. 6, Pic(i) (where "i" is an integer) indicates a picture in which a block indicating the section to which error judgment is applied is located. The processing of a plurality of blocks (Pic (i) to Pic (i+2N+1)) is shown in order of movement of an intra-slice from the lower side to the upper side. The arrow YB shows the movement direction of the intra-slice.

Intra-slices IS (N) to (1) are intra-slices corresponding to blocks in the picture. Timings 211 and 213 indicate restore points where stopping a display may be released. A period 215 indicates an area of error judgment for one picture between the timing 211 and the timing 213.

An overview of the refresh operation in which an intra-slice circulates from the lower side will not be explained fully here, as the operation is almost the same as that of the refresh operation from the upper side illustrated in FIG. 5.

A similar judgment process as in FIG. 5 is performed in FIG. 6 as well, and the restore point may be determined to be a timing 213 at the shortest when an error occurs outside the refreshed area. On the other hand, if an error occurs in the refreshed area, the restore point is the next restore point located after the timing 213.

As illustrated in the above operation explanations of FIG. 5 and FIG. 6, a moving image decoding apparatus 1 may support encoded data in which an intra-slice circulates both from the upper side to the lower side and from the lower side to the upper side. Thus, the moving image decoding apparatus 1 provides versatility to support moving image encoding apparatuses in which an intra-slice circulates from either direction.

Moreover, the moving image decoding apparatus 1 supports a refresh method in which an intra-slice does not need to be set for each picture; in other words, the moving image decoding apparatus 1 supports a refresh method that uses both intra-slices and vector limits.

Figure 7:
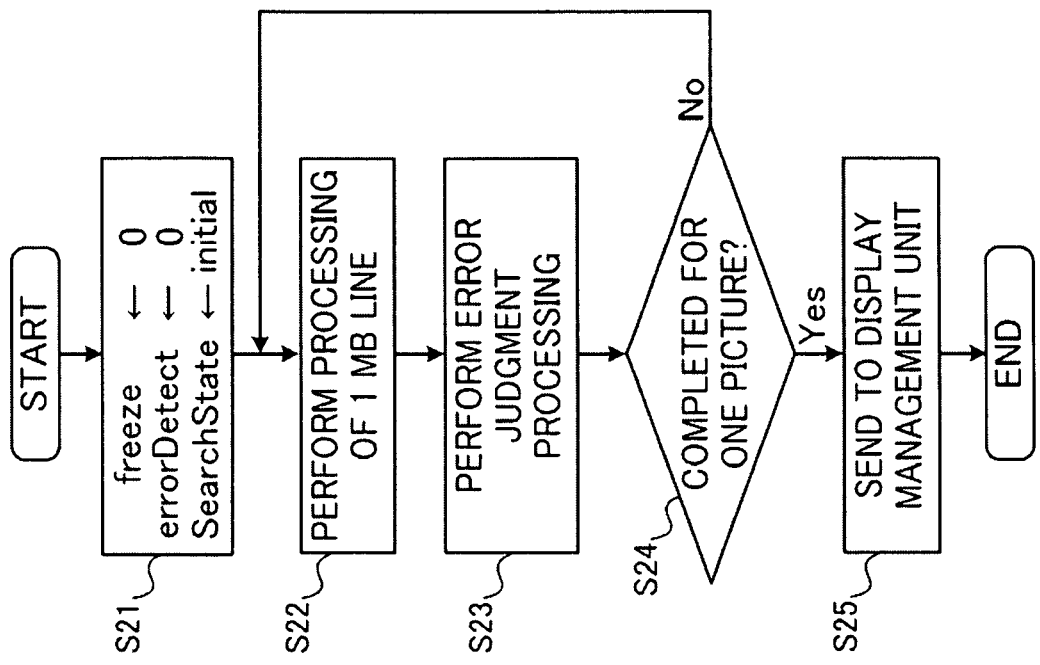
FIG. 7 is a processing flow of decoding one picture when refreshing from the upper side.

FIG. 7 is a processing flow of decoding one picture when refreshing from the upper side.

Upon initiating decoding of a picture Pic_A (FIG. 4), a data decoding processing unit 31 initializes processing variables for error judgment (Operation S21). The operation variables are, for example, "freeze" (variable for freeze settings), "errorDetect" (error detection flag), and "searchState" (variable for search area). For example, "freeze=1" indicates an instruction to stop display, "errorDetect=1" indicates that an error is detected within a refreshed area. The variable "searchState=Active" indicates a search within a refreshed area, while "Negative" indicates a search outside the refreshed area.

The data decoding processing unit 31 processes data of one MB line in a picture Pic_A (Operation S22), for example, the MB line L1. When refresh is performed from the upper side of a picture Pic_A (direction of arrow YA), the judgment processing is performed from a judgment J1 of MB line L1.

At this time, an error detection unit 41 looks for a decoding error every MB line. Then an error judgment unit 43 performs an error judgment processing (Operation S23). The detailed processing flow of error judgment is illustrated in FIG. 8 and will be described later.

The error judgment unit 43 judges whether all of the judgments J1 to J8 in the picture Pic_A are completed or not, and returns to processing of Operation S22 if an unprocessed MB line exists (Operation S24: No). The error judgment unit 43 notifies the decoding result notification unit 45 of a result of the error judgment when the processing of all MB lines for one picture is completed (Operation S24: Yes).

Then, the decoding result notification unit 45 sends a decoding result that includes the error judgment result to the display management unit 15 (Operation S25). Based on the sent contents, the display management unit 15 sets stop or restart of the screen display. Then, based on the settings, the display setting unit 53 restarts and/or stops the display at a specified timing.

Figure 8:
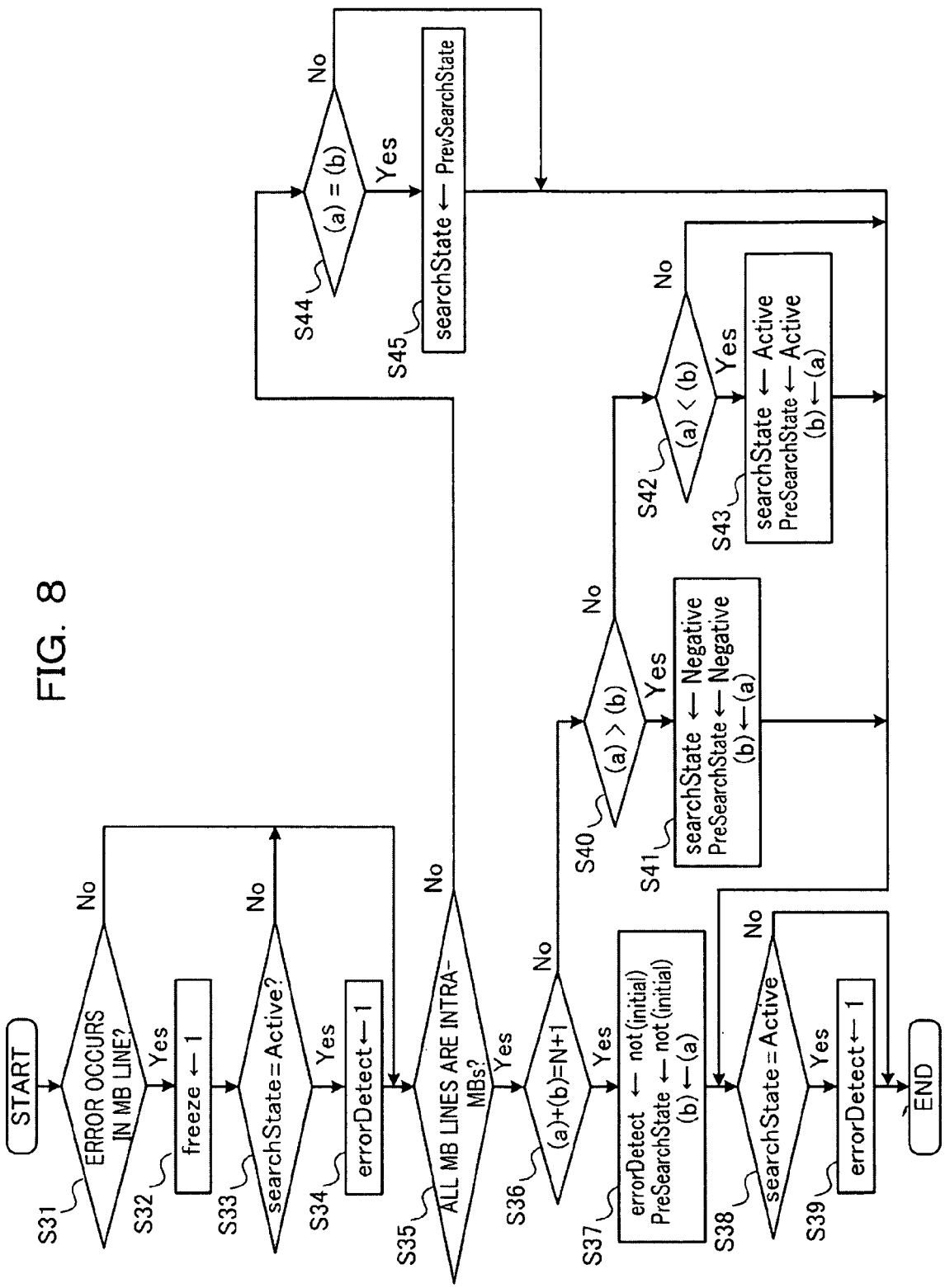
FIG. 8 is a processing flow of an error judgment when refreshing from the upper side.

FIG. 8 is a detailed processing flow of error judgment in Operation S23.

The error judgment unit 43 judges whether or not a decoding error occurs in the area of the MB line currently being processed (Operation S31). If a decoding error occurs (Operation S31: Yes), the variable "freeze" of a freeze setting is set to "1" (Operation S32).

After the setting, the error judgment unit 43 judges whether the MB line currently being processed is within the refreshed area or not ("searchState=Active" (Operation S33).

If an error occurs in the refreshed area (Operation S33: Yes), an error detection flag "errorDetect=1" is set (Operation S34) and the operation proceeds to the next processing (Operation S35).

Operations S35 to S45 shown below are processing flows for judging whether the error occurs within or outside of the refreshed area.

The error judgment unit 43 judges whether all of the MB lines are intra-MBs or not (Operation S35). If all of the MB lines are intra-MBs (Operation S35: Yes), the following is judged: whether or not the sum of the line number (a) of the MB line currently processed and the line number (b) of intra-slices in the preceding picture is equal to the sum of (N) plus 1 ("(a)+(b)=N+1") (Operation S36).

If the sums are equal (Operation 36: Yes), the intra-slice has circulated from the lower side to the upper side (or from the upper side to the lower side).

When the intra-slice has circulated, the variable "initial" is reversed ("Active" to "Negative" or "Negative" to "Active"), and the value is retained in the variables "search State" and "Pre Search State". When the next picture is processed, the line number (b) of the intra-slice in the preceding picture will be the line number (a) of the MB line currently being processed. Thus the value of (b) is updated to the value of (a) (Operation S37).

When "(a)+(b)=N+1" is not satisfied (Operation S36: No), the value of the line number (a) of the MB line currently being processed and the value of the line number (b) of the intra-slice in the preceding picture are compared (Operation S40).

When "(a)>(b)" is satisfied (Operation S40: Yes), the intra-slice is judged to have moved from the upper side to the lower side. The area lower than the MB line is assumed to be outside the refreshed area, and the "search State" variable and "Pre Search Stage" variable are set to "Negative." When the next picture is processed, the line number (b) of the intra-slice in the preceding picture becomes the line number (a) of the MB line currently being processed. Thus the value of (b) is updated to (a) (Operation S41).

When "(a)>(b)" is not satisfied (Operation S40: No), the value of the line number (a) of the MB line currently being processed and the value of the line number (b) of the intra-slice in the preceding picture are further compared (Operation S42).

When "(a)<(b)" is satisfied (Operation S42: Yes), the intra-slice is judged to have moved from the lower side to the upper side. The area lower than the line is assumed to be within the refreshed area, and variables of "search State" and "Pre Search State" are set to "Active". When the next picture is processed, the line number (b) of the intra-slice in the preceding picture becomes the line number (a) of the MB line currently being processed. Thus the value of (b) is updated to (a) (Operation S43).

When an intra-slice exists as above, a judgment of within or outside the refreshed area is completed by the processing described above. However, if no intra-slice exists, the processing proceeds to Operation S44.

When all of the MB lines are not intra-MBs (Operation S35: No), whether a line number (a) of the MB line currently being processed and a line number (b) of intra-slice in the preceding picture (b) are equal or not is judged (Operation S44).

The state "(a)=(b)" (Operation S44: Yes) indicates that the processing has progressed to the same position as the preceding picture, and in order to make the processing thereafter the same state as the preceding picture, a value of the variable "PresearchState" is set to the value of the variable "searchState." Then the refresh area is determined (Operation S45).

As a result of updating the refreshed area, if an MB line lower than the MB line number (a) currently being processed is determined to be outside the refreshed area ("searchstate=Negative") (when circulated from upper side), the error judgment process is completed (Operation S38: No).

When an MB line number currently being processed is within the refreshed area ("searchState=Active") (Operation S38: Yes), the error is judged to occur within the refreshed area, and "errorDetect=1" is set, and then, the error judgment process is completed. (Operation S39).

An explanation of the processing flows of decoding and judging errors for one picture when refreshing from the lower side is omitted here because the basic processing of the operations are similar to the above explained processing flow of refreshing from the upper side, although the refreshing direction is different.

A decoding result notification unit 45 transfers a notification of the decoding result that includes the existence or non-existence of errors together with a decoded picture to a decoding result receiving unit 61 of the display management unit 1 after completing processing for one picture.

Figure 9:
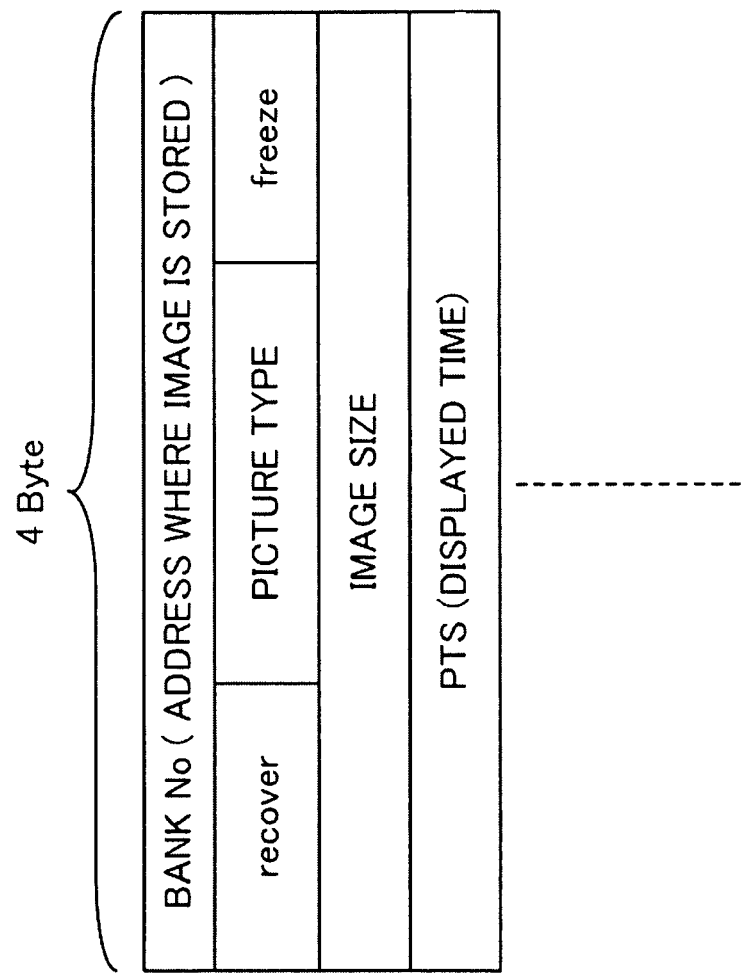
FIG. 9 is a diagram illustrating an example of information structure notified to a display management unit.
Figure 12:
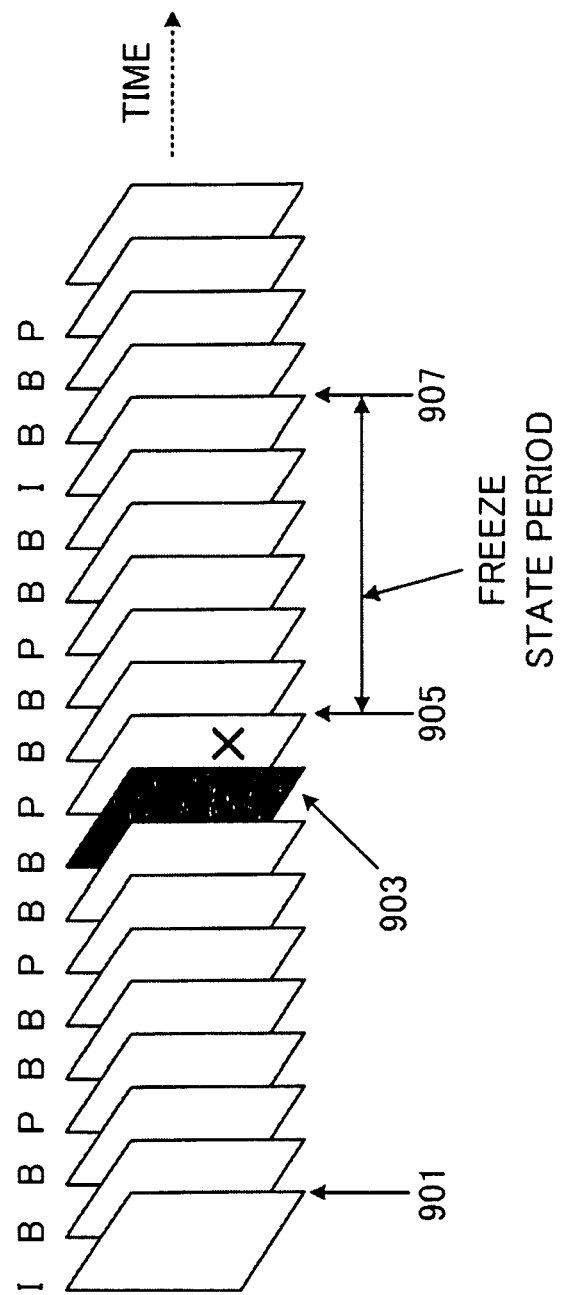
FIG. 12 is an explanatory diagram illustrating pictures of moving image frames and error occurrence in MPEG-2.

FIG. 9 is a diagram illustrating an example of a data structure of information notified to a display management unit 15.

In the notification illustrated in FIG. 9, "Bank No" is an address where an image is stored in a memory. "Recover" is defined as the frame timing that becomes a restore point. "Picture type" indicates either an "I-picture", "B-picture", or "P-picture". "Freeze" is defined as information that indicates whether an error occurs or not.

"Image size" indicates information on the size of a screen. "PTS" indicates information on a displayed time.

The decoding result receiving unit 61 of the display management unit 15 receives the information. Then, based on the notified information, a freeze setting unit 57 and a restore point determination unit 59 set the given settings.

For example, the freeze setting unit 57 sets a picture to be frozen by frame timing when "freeze=1".

When the processing of one picture is complete, "errorDetect=0", and SPS, PPS, and SEI exist, the frame timing becomes the restore point, and the framer timing is notified to the display management unit 15 as "recover=1". The SPS, PPS, and SEI are decoded prior to the processing of the picture, thus a restore point may be determined. Therefore, a restore point determination unit 59 sets the frame timing where the SPS, PPS, and SEI exist as a restore point based on "recover" information.

FIG. 10 is a diagram illustrating an overview of an operation from error detection to recovery when refreshing from the upper to the lower sides of a picture. FIG. 11 is a diagram illustrating an overview of an operation from error detection to recovery when refreshing from the lower side to the upper side of a picture. In order to simplify the explanation, an overview of operation of this embodiment in FIG. 10 and FIG. 11 will be described for an example of a picture that includes an intra-slice excluding a case that includes a picture with a vector limit. For each block of a frame, the shaded area and the area including the intra-MB position is the "Active" area, and the white area corresponds to the "Negative" area.

FIG. 10A illustrates an overview of an operation when an error occurs within the refreshed area during circulation of the intra-slice, while FIG. 10B illustrates an overview of an operation when an error occurs outside the refreshed area during circulation of the intra-slice.

In FIG. 10A and FIG. 10B, timings 301, 303, 305, and 307, timings 331, 333, 335, and 337 indicate timings when parameters of header information of AVC/H.264 encoded data in the first intra MB in a intra refresh cycle are received. The parameter information includes information such as SPS, PPS, and SEI.

In FIG. 10A, an error occurrence time 309 indicates a frame timing when a decoding error occurs in an Active area. A picture 323 is a picture at the error occurrence time 309; the picture 321 is the picture immediately before the error occurrence.

When an error detection unit 41 detects an error at the error occurrence time 309, "freeze" information is set to "1". A freeze setting unit 57 of a display management unit 15 sets freeze at a picture 321 that is before the error occurrence time 309, and a display setting unit 53 sets a display setting that continues to display the picture 321.

A restore point 311 is a frame timing to release the display setting. If no decoding error occurs in a period 313 from the error occurrence time 309 to the timing 311, the timing 311 becomes a restore point, and the screen display may be updated at a picture 325 that is the next frame timing. When the error judgment unit 43 judges that an error occurs in the Active area, the error judgment unit 43 sets "recover=1" for the timing 311, based on the "recover" information.

A restore point determination unit 59 of the display management unit 15 sets the timing 311 as a restore point, and the display setting unit 53 sets a display update at a picture 325 that is the frame timing next to the timing 311.

In FIG. 10B, an error occurrence point 339 indicates a frame timing when a decoding error occurs in Negative area.

A picture 353 is the picture at the error occurrence, and a picture 351 is the picture immediately before the error occurrence.

When an error detection unit 41 detects an error at the error occurrence time 339, "freeze" information is set to "1". A freeze setting unit 57 of a display management unit 15 sets freeze at a picture 351 that is before the error occurrence time 339, and a display setting unit 53 sets a display setting that continues to display the picture 351.

A restore point where the display setting may be released is frame timing 341. If no decoding error occurs in a period 343 from the error occurrence time 339 to the timing 341, the timing 341 becomes the restore point, and the screen display may be updated at a picture 355 that is the next frame timing.

At this time, the error judgment unit 43 judges that the error occurs in Negative area, and sets "recover=1" for the timing 341 based on the "recover" information.

A restore point determination unit 59 of the display management unit 15 sets the timing 341 as a restore point, and the display setting unit 53 sets a display update at a picture 355 that is the frame timing next to the timing 341.

FIG. 11A illustrates an overview of an operation when an error occurs within the refreshed area during circulation of the intra-slice, while FIG. 11B illustrates an overview of an operation when an error occurs outside the refreshed area during circulation of the intra-slice.

In FIG. 11A and FIG. 11B, timings 401, 403, 405, and 407, timings 431, 433, 435, and 437 indicate frame timings when parameters on the header information of the encoded data are received in the first intra-MB of a refresh cycle.

In FIG. 11A, an error occurrence time 409 indicates a frame timing when a decoding error occurs in an Active area. A picture 423 is a picture at the error occurrence time 409; a picture 421 is a picture immediately before the error occurrence.

The timing 411 is frame timing that becomes a restore point where a picture 421, that is a picture before the error occurrence time 409, has been continuously displayed and the display may be released. If no decoding error occurs in a period 413 from the error occurrence time 409 to the timing 411, then the display may be updated at the picture 425 that is the frame timing next to the timing 411.

In FIG. 11A, settings of "freeze" and "recover" etc. are performed in a similar manner as in FIG. 10 A. Thus, the explanation is omitted.

In FIG. 11B, an error occurrence point 439 indicates a frame timing where a decoding error occurs in a Negative area. A picture 453 is the picture of a frame timing at an error occurrence. A picture 451 is the picture of a frame timing immediately before the error occurrence.

The timing 441 is a frame timing that becomes a restore point where a picture 451, that is a picture before the error occurrence, has been continuously displayed and the display may be released. In other words, the timing 441 is a restore point, and a display of the picture 455 of the next frame timing may be updated.

In FIG. 11B, settings of "freeze" and "recover" etc. are performed in a similar manner as in FIG. 10A. Thus, the explanation is omitted.

As explained above, the moving image decoding apparatus 1 judges whether or not an error occurs in an area that has already been refreshed (e.g., whether the error occurs in an "Active" area or "Negative" area) regardless of direction of an intra-slice circulation, and then controls the display accordingly.

Therefore, after displaying a picture 321 (or 351, 421, 451), the moving image decoding apparatus 1 continues to display the picture 321, instead of a picture 323 (or 353, 423, 453), that is a picture at the error occurrence time, until the frame timing of the restore point 311 where a period 313 (or 343, 413, 443) is passed and the next refresh period is completed.

If an error occurs in a "Negative" area, the error may be refreshed immediately and restored without being propagated spatially. Thus, restore points are determined to be a timing 341 and a timing 441 based on information included in the SEI parameter information received at the frame timing 335 and the frame timing 435. Then, the display may be updated to normal pictures 355 and 455 at the next frame timings, that is a period 343 and a period 443 which are the shortest periods after the error occurrences.

The moving image decoding method explained in this embodiment may be achieved by causing a computer such as a personal computer and/or a workstation to execute a prepared program. Such a program may be stored in a computer-readable storage medium such as a hard disk, a flexible disk, compact disc ROM (CD-ROM), magneto-optical (MO) disk, and digital versatile disk (DVD), and executed by a computer. The program may be transmission medium distributable through a network such as the Internet.

Although embodiments have been shown and described, it would be appreciated by those skilled in the art that changes may be made in these embodiments without departing from the principles and spirit of the invention, the scope of which is defined in the claims and their equivalents.

What is claimed is:

1. A decoding apparatus that decodes moving image data using an intra-slice refreshing, comprising:
   a processor, the processor configured to execute a process including:
   recognizing restore points in the moving image data where an intra-slice refreshing cycle starts, from header information of the moving image data;
   selecting an intra-macroblock line of each frame of the moving image data, from a plurality of macroblock lines in each frame of the moving image data, the intra-macroblock line being one of the plurality of macroblock lines and intra-slice being applied;
   identifying a refreshed area of each frame of the moving image data, the refreshed area being an area of macroblock lines which became the intra-macroblock line between a latest intra-slice starting point and each frame of the moving image data;
   detecting whether a decoding error occurs;
   judging, when a decoding error occurs, whether a place where the decoding error occurs is within the refreshed area; and
   determining a restore point for updating the moving image data to be an intra-slice starting point at a shortest timing when the place is outside the refreshed area, and determining the restore point to be a next intra-slice starting point after the intra-slice starting point at the shortest timing when the place is within the refreshed area.

2. The decoding apparatus according to claim 1, wherein the judging identifies the refreshed area based on positions of the intra-macroblock line in two consequent frames of the moving image data.

3. The decoding apparatus according to claim 1, wherein the judging identifies the refreshed area based on positions of the intra-macroblock line in two consequent frames of the moving image data and the refreshed area in a preceding frame of the consequent frames of the moving image data.

4. The decoding apparatus according to claim 1, wherein the determining determines, as a restore point, a frame of the moving image data that includes restore information immediately after refreshing an area that includes an occurrence position of the decoding error when the occurrence position of the decoding error is determined to have occurred outside the refreshed area.

5. A decoding method that decodes moving image data using an intra-slice refreshing, the method comprising;
   recognizing restore points in the moving image data where an intra-slice refreshing cycle starts, from header information of the moving image data;
   selecting an intra-macroblock line of each frame of the moving image data, from a plurality of macroblock lines in the each frame of the moving image data, the intra-macroblock line being one of the plurality of macroblock lines and intra-slice being applied;
   identifying a refreshed area of each frame of the moving image data, the refreshed area being an area of macroblock lines which became the intra-macroblock line between a latest restore point and each frame of the moving image data;
   detecting whether a decoding error occurs;
   judging, when a decoding error occurs, whether a place where the decoding error occurs is within the refreshed area;
   determining a restore point for updating the moving image data to be an intra-slice starting point at a shortest timing when the place is outside the refreshed area, and determines the restore point to be a next intra-slice starting point after the intra-slice starting point at the shortest timing when the place is within the refreshed area.

6. A non-transitory computer-readable storage medium storing a moving image data decoding program that causes a processor to execute a process, the process comprising:
   recognizing restore points in the moving image data where an intra-slice refreshing cycle starts, from header information of the moving image data;
   selecting an intra-macroblock line of each frame of the moving image data, from a plurality of macroblock lines in the each frame of the moving image data, the intra-macroblock line being one of the plurality of macroblock lines and intra-slice being applied;
   identifying a refreshed area of the each frame of the moving image data, the refreshed area being an area of macroblock lines which became the intra-macroblock line between a latest restore point and each frame of the moving image data;
   detecting whether a decoding error occurs;
   judging, when a decoding error occurs, whether a place where the decoding error occurs is within the refreshed area;
   determining a restore point for updating the moving image data to be an intra-slice starting point at a shortest timing when the place is outside the refreshed area, and determines the restore point to be a next intra-slice starting point after the intra-slice starting point at the shortest timing when the place is within the refreshed area.

* * * * *